United States Patent
Horikoshi

(10) Patent No.: US 7,215,465 B2
(45) Date of Patent: May 8, 2007

(54) OPTICAL LOW PASS FILTER

(75) Inventor: Takashi Horikoshi, Saitama (JP)

(73) Assignee: Nihon Dempa Kogyo Co., Ltd., Tokyo (JP)

( * ) Notice: Subject to any disclaimer, the term of this patent is extended or adjusted under 35 U.S.C. 154(b) by 0 days.

(21) Appl. No.: 11/201,571

(22) Filed: Aug. 11, 2005

(65) Prior Publication Data

US 2006/0039062 A1    Feb. 23, 2006

(30) Foreign Application Priority Data

Aug. 20, 2004    (JP)    ............... 2004-240290

(51) Int. Cl.
   *F21V 9/04*    (2006.01)
   *G02B 1/10*    (2006.01)

(52) U.S. Cl. ............ 359/359; 359/361; 359/586; 359/587

(58) Field of Classification Search ........ 359/350–361, 359/577–590; 428/212–213, 699
See application file for complete search history.

(56) References Cited

U.S. PATENT DOCUMENTS

| | | | | |
|---|---|---|---|---|
| 4,229,066 A | * | 10/1980 | Rancourt et al. | 359/359 |
| 5,103,337 A | * | 4/1992 | Schrenk et al. | 359/359 |
| 5,448,404 A | * | 9/1995 | Schrenk et al. | 359/584 |
| 5,705,882 A | | 1/1998 | Oughton et al. | 313/112 |
| 6,356,020 B1 | * | 3/2002 | Cottaar | 313/635 |
| 6,927,900 B2 | * | 8/2005 | Liu et al. | 359/359 |
| 7,157,159 B2 | * | 1/2007 | Kondo | 428/699 |

FOREIGN PATENT DOCUMENTS

| | | |
|---|---|---|
| EP | 1 437 609 A | 7/2004 |
| GB | 2 103 830 A | 2/1983 |

OTHER PUBLICATIONS

"Skillful Use of Design and Simulation Software-Revised Edition," published by Optronics Ltd., May 14, 2003, pp. 150-152.

* cited by examiner

*Primary Examiner*—Thong Q Nguyen
(74) *Attorney, Agent, or Firm*—Scott D. Wofsy; Edwards Angell Palmer & Dodge LLP

(57) ABSTRACT

An optical device includes first and second laminated films of alternate layers of optical thin films of high refractivity material and low refractivity material, and having an optical film thicknesses of "a" and "b" respectively; wherein b>a, and an optical plate on which the first laminated film and the second laminated film are formed in sequence from at least one primary surface of the optical plate, wherein a third laminated film comprised of a lamination of optical thin films of high refractivity material and low refractivity material and having an optical film thickness "c" is interposed between the first laminated film and the second laminated film, wherein b>c>a. As a result, an optical device which has spectral characteristics where ripple in the opaque zone which blocks infrared light is suppressed, can be obtained.

6 Claims, 6 Drawing Sheets

OPTICAL LOW PASS FILTER

BACKGROUND OF THE INVENTION

1. Field of the Invention

The present invention relates to an optical low pass filter having an infrared shield film (hereafter referred to as a "shield film"), and more particularly to a shield film which blocks infrared light and suppresses ripple (variations in transmittance) in an opaque zone.

An optical low pass filter is incorporated, for example, in front of a CCD in a camera device to cancel color Moire fringes and the like. Optical low pass filters generally block infrared light and pass only light of short wavelengths to prevent negative effects on imaged color (read color) in the optical system. The shield film which blocks the infrared light is normally formed from laminations of optical thin films of materials of low and high refractivity.

2. Description of the Related Art

FIG. 3A and FIG. 3B are partial enlarged cross-sectional views illustrating an example of a conventional optical low pass filter.

As shown in FIG. 3A and FIG. 3B, the optical low pass filter is provided with a shield film 2 which blocks infrared light on, for example, one primary surface of an optical plate 1 comprised of a single layer or laminates of quartz or glass and the like. The optical plate 1 fundamentally transmits light of all infrared wavelengths $\lambda$ (wavelength $\lambda$=650 nm or greater). The shield film 2 provides an opaque zone by absorbing light of wavelength $\lambda$ between 650 nm and 1050 nm being the infrared region. As a result, spectral characteristics as shown in FIG. 4 are obtained, wherein wavelengths $\lambda$ between approximately 400 nm and 650 nm being visible light are a transparent zone.

Normally, as shown in FIG. 3B, the shield film 2 comprising a first laminated film 4a and a second laminated film 4b provided in sequence is formed on at least one primary surface of the optical plate 1. The first and second laminated films 4a and 4b are both formed by alternately laminating transparent optical thin films 3 of high refractivity material (3H) and low refractivity material (3L) by, for example, vapor deposition in, for example, twenty of more layers. Here, the low refractivity material comprises for example, silicon oxide ($SiO_2$), and the high refractivity material comprises titanium oxide ($TiO_2$).

Here, the optical film thicknesses of the optical thin films 3 of the first and second laminated films 4a and 4b are "a" and "b". Generally, the optical film thickness "a" of the optical thin film 3 in the first laminated film 4a is between 1.0 and 1.3, and the optical film thickness "b" of the second laminated film 4b is between 1.4 and 1.7. Here, the optical film thickness is expressed as the product of the refractivity n and the physical thickness d (n×d) of the high refractivity material or the low refractivity material, and the optical film thickness $\lambda/4$ at the design wavelength $\lambda$ is normally shown as 1.0.

Furthermore, the design wavelength $\lambda$ is 650 nm being the infrared region, and the optical film thicknesses "a" and "b" are set with $\lambda/4$ (162.5 nm) as "1". The opaque zone for the first laminated film 4a is for example between 650 nm and 870 nm, and the opaque zone for the second laminated film 4b is for example between 870 nm and 1050 nm. As a result, spectral characteristics which block infrared light in the aforementioned opaque zone between 650 nm and 1050 nm can be obtained (see "Skillful Use of Design and Simulation Software—Revised Edition", pp 150–152, published by Optronics Ltd., May 14, 2003).

However, with the optical low pass filter of the conventional example of the above described construction, there is a problem in that, as shown in FIG. 4, infrared light is not sufficiently blocked in the wavelength $\lambda$ 870 nm region at the interface between the first laminated film 4a and the second laminated film 4b, and ripple (variation in transmittance) occurs. Moreover, this ripple has a negative effect on imaged color in the optical system, as described above.

An object of the present invention is to provide an optical low pass filter which has spectral characteristics where ripple in the opaque zone which blocks infrared light is suppressed.

SUMMARY OF THE INVENTION

The present invention is an optical device comprising a laminated optical plate with; a first laminated film of alternate layers of optical thin films of high refractivity material and low refractivity material, and having an optical film thickness "a"; and a second laminated film of alternate layers of optical thin films of high refractivity material and low refractivity material, and having an optical film thickness "b" (where "b">"a"), and in which the first laminated film and the second laminated film are formed in sequence from at least one primary surface of the optical plate, wherein a third laminated film comprised of a lamination of optical thin films of high refractivity material and low refractivity material and having an optical film thickness "c" (where "b">"c">"a") is interposed between the first laminated film and the second laminated film.

According to this configuration, in the present invention, since a third laminated film of an optical film thickness "c" intermediate between the optical film thicknesses of the first laminated film and the second laminated film is interposed between the first laminated film and second laminated film of optical film thicknesses "a" and "b", ripple in the opaque zone can be suppressed.

Moreover, in the present invention, the optical film thickness "a" is between 1.0 and 1.3, the optical film thickness "b" is between 1.4 and 1.7, and the optical film thickness "c" is between 1.301 and 1.399. Furthermore, in the present invention, the third laminated film is in two layers comprising an optical thin film of high refractivity material and an optical thin film of low refractivity material.

DETAILED DESCRIPTION OF THE PREFERRED EMBODIMENTS

Figure 1A:
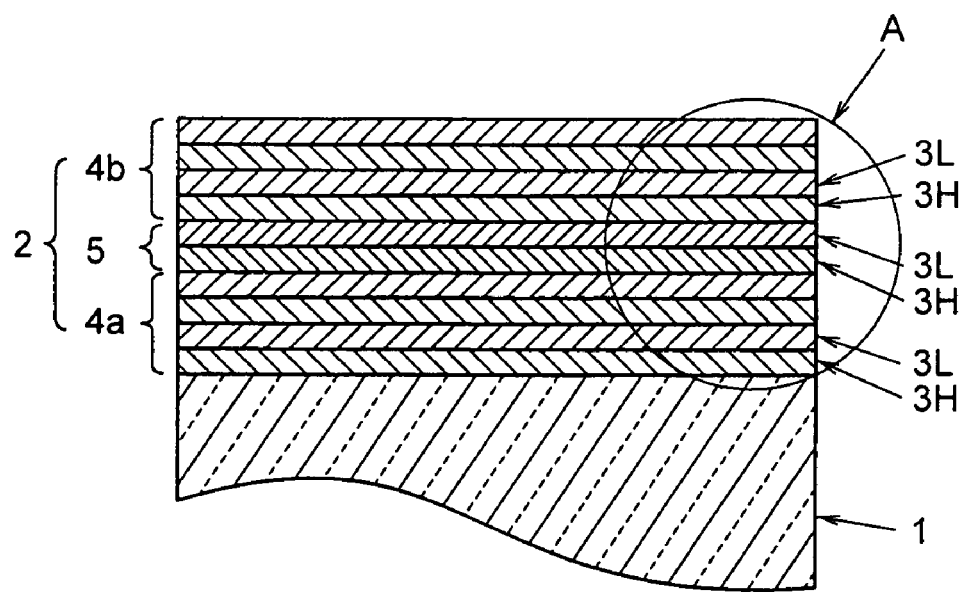
FIG. 1A is a partial enlarged cross-sectional view illustrating an embodiment of an optical low pass filter of the present invention.
Figure 1B:
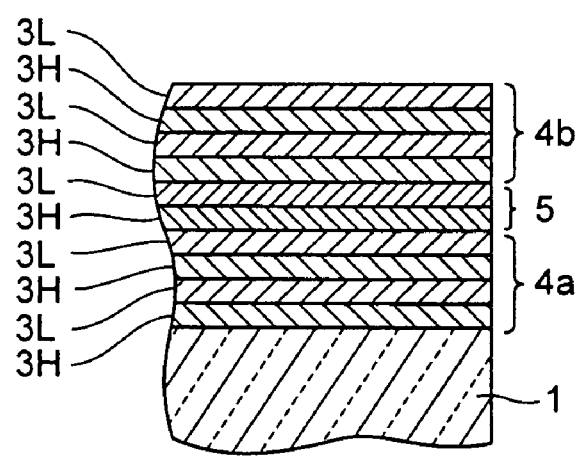
FIG. 1B is a partial enlarged view of the arrow A part in FIG. 1A.

FIG. 1A and FIG. 1B are partial enlarged cross-sectional views illustrating an embodiment of an optical low pass filter of the present invention.

As shown in FIG. 1A and FIG. 1B, the optical low pass filter of the present invention comprises a shield film 2 which provides an opaque zone in which light in the infrared region of wavelength λ of between 650 nm and 1050 nm is absorbed, on at least one primary surface of an optical plate 1. Here, the shield film 2 comprises first and second laminated films 4a and 4b of alternate layers of optical thin films 3 (3H, 3L) of high refractivity material and low refractivity material vacuum deposited on the optical plate 1, and a third laminated film 5 interposed between the first laminated film 4a and the second laminated film 4b.

The first laminated film 4a and the second laminated film 4b are formed by laminating by vapor deposition, for example, 20 or more layers of optical thin films 3, arranged in first and second laminated films 4a, 4b, each of the optical thin films 3 having an optical film thickness "a" of between 1.0 and 1.3, and "b" of between 1.4 and 1.7, respectively. The optical film thickness "c" of each optical thin film 3 the third laminated film 5 is between 1.301 and 1.399, intermediate between that of the first and second laminated films 4a and 4b. Here, the third laminated film 5 has, for example, two optical thin films 3, each having an optical film thickness "c" of 1.33792 (high refractivity material 3H) and 1.34445 (low refractivity material 3L).

The optical film thickness is expressed as the product of the refractivity n and the physical thickness d (n×d) of the high refractivity material and the low refractivity material, and the optical film thickness λ/4 at the design wavelength λ is normally shown as 1.0.

Figure 2:
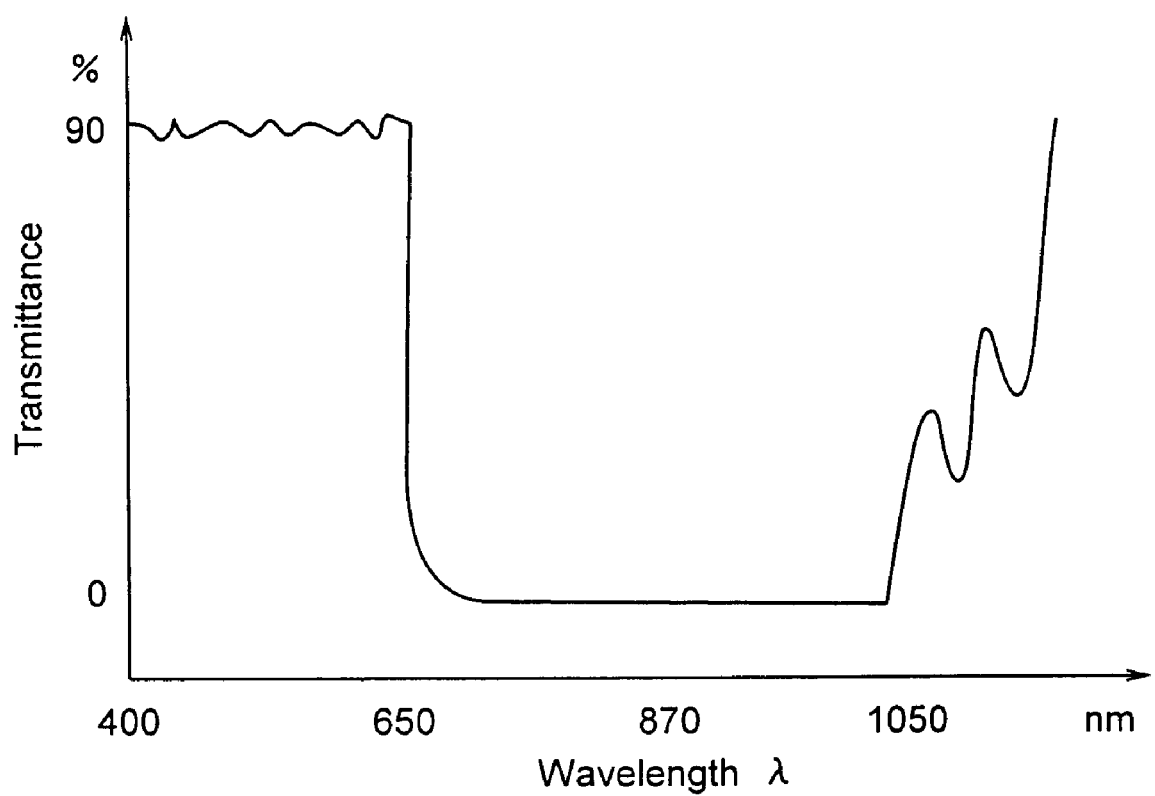
FIG. 2 is a spectral characteristics diagram of an optical low pass filter illustrating an operation of the embodiment of the present invention.
Figure 3A:
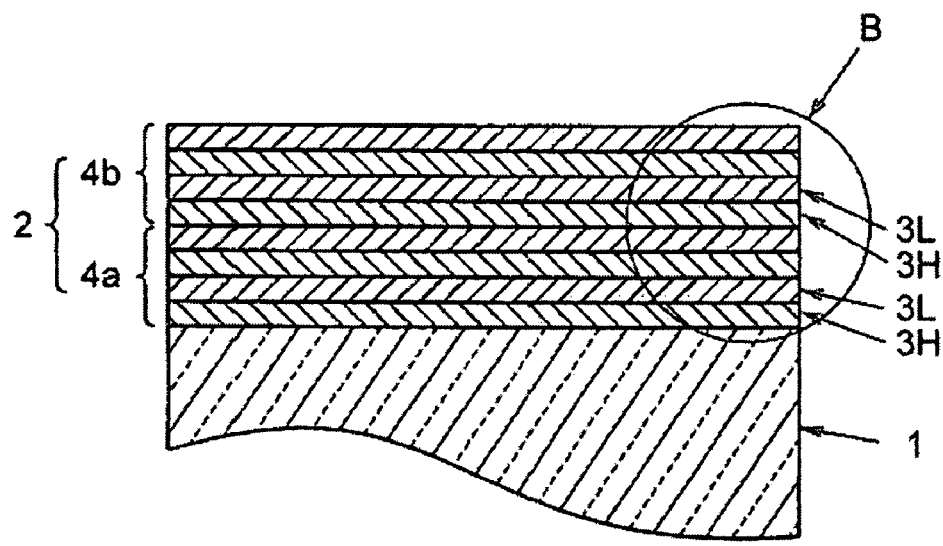
FIG. 3A is a partial enlarged cross-sectional view of a conventional example of an optical low pass filter.
Figure 3B:
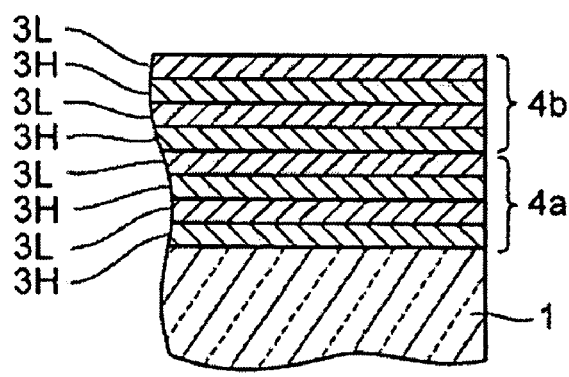
FIG. 3B is a partial enlarged view of the arrow B part in FIG. 3A.
Figure 4:
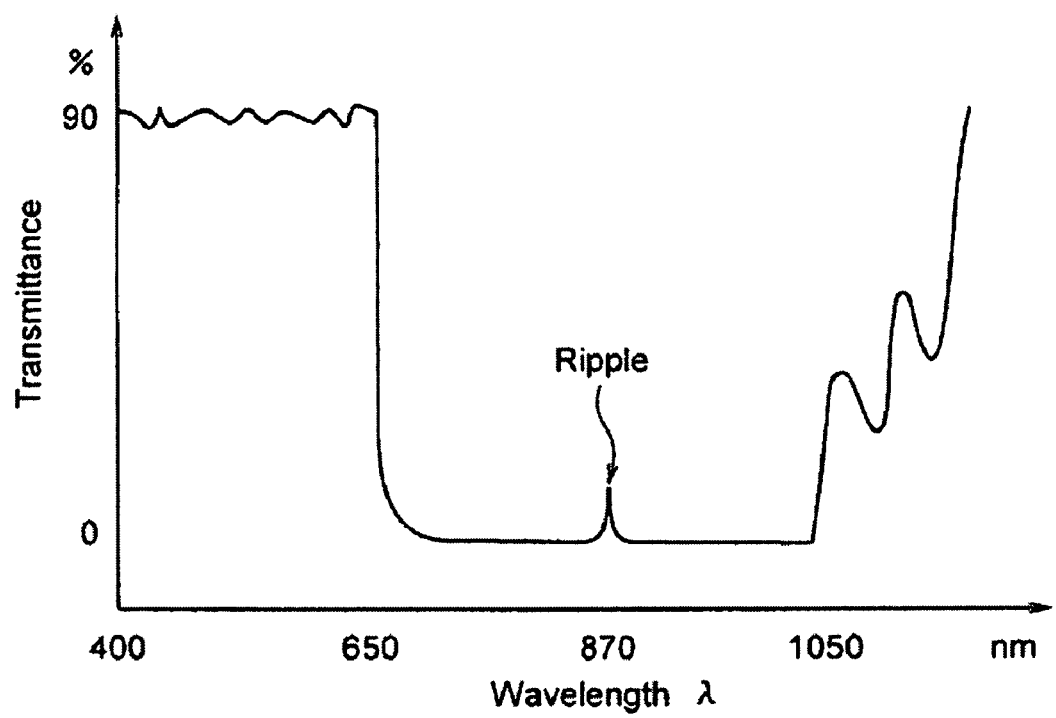
FIG. 4 is a spectral characteristics diagram of a conventional example of an optical low pass filter.

According to this configuration, since the third laminated film 5 of an optical film, having a thickness "c" between the optical film thicknesses of the first laminated film 4a and the second laminated film 4b is interposed between the first laminated film 4a and the second laminated film 4b, spectral characteristics which suppress the ripple occurring in the opaque region at the aforementioned wavelength λ of 870 nm can be obtained, as seen in FIG. 2. Moreover, in this embodiment, since the construction of the third laminated film 5 is of only two layers of high refractivity material (3H) and low refractivity material (3L), the film thickness of the third laminated film 5 can be minimized.

Figure 1C:
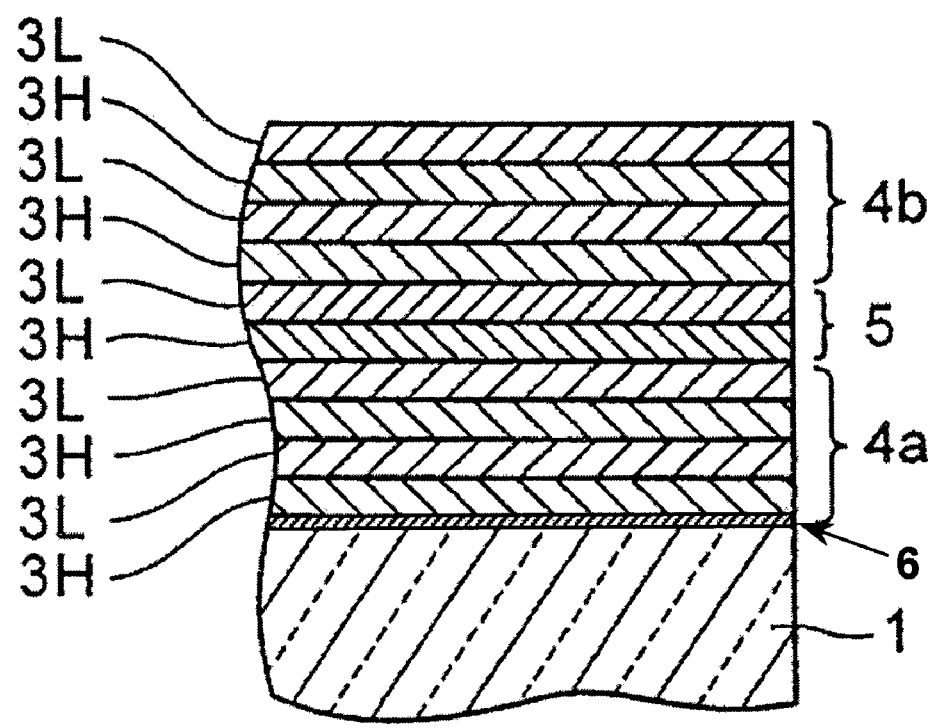
FIG. 1C is a partial enlarged cross-sectional view illustrating an embodiment of an optical low pass filter of the present invention, including an optical thin film interposed between the lower surface of a first laminated film and the surface of an optical plate.
Figure 1D:
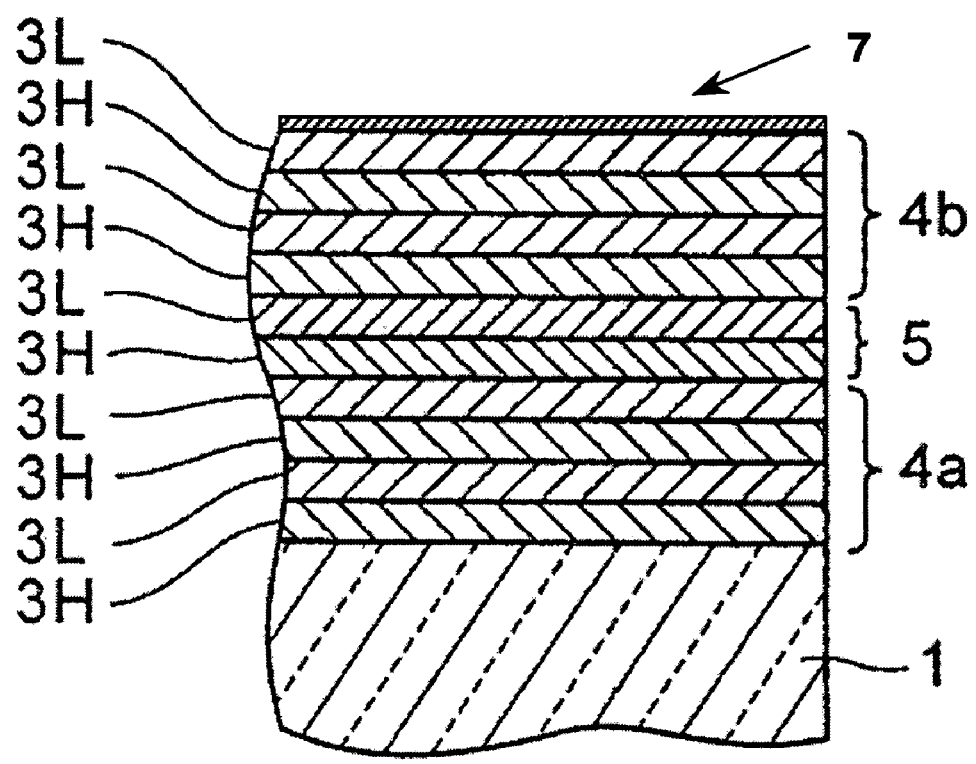
FIG. 1D is a partial enlarged cross-sectional view illustrating an embodiment of an optical low pass filter of the present invention, including an optical thin film provided on the upper surface of a second laminated film.

In the aforementioned embodiment, the first laminated film 4a has an optical film thickness "a" of between 1.0 and 1.3. However, as seen in FIG. 1C, for example an optical thin film 6 of an optical film thickness of between approximately 0.1 and 0.9 may be interposed between the lower surface of the first laminated film 4a and the surface of the optical plate 1.

Similarly, the second laminated film 4b has an optical film thickness "b" of between 1.4 and 1.7. However, as seen in FIG. 1C, for example, an optical thin film 7 of an optical film thickness of between approximately 0.1 and 0.9 may be provided on the upper surface of the second laminated film 4b as a buffer with the air on the surface of the optical low pass filter.

Furthermore, in the aforementioned embodiment, the third laminated film 5 comprises two layers of optical thin film of high refractivity material and low refractivity material. However a configuration of a greater number of layers (for example, four or six layers) laminated alternately may also be used. By increasing the number of layers in this manner, ripple can be further reduced.

What is claimed is:

1. An optical low pass filter including an optical plate having an infrared shield film, the infrared shield film comprising;
   (a) a first laminated film including alternating layers of optical thin films of high refractivity material and low refractivity material, each layer of optical thin film having an optical film thickness "a";
   (b) a second laminated film including alternating layers of optical thin films of high refractivity material and low refractivity material, each layer of optical thin film having an optical film thickness "b", and in which said first laminated film and said second laminated film are laminated in sequence from at least one primary surface of the optical plate; and
   (c) a third laminated film including a lamination of alternating layers of optical thin films of high refractivity material and low refractivity material, each layer of optical thin film having an optical film thickness "c", the third laminated film being interposed between said first laminated film and said second laminated film, wherein b>c>a, wherein said optical film thickness a is between about 1.0 and about 1.3, said optical film thickness b is between about 1.4 and about 1.7, and said optical film thickness c is between about 1.301 and about 1.399, and wherein the optical film thickness λ/4 for the design wavelength λ is 1, whereby a ripple in an opaque zone, which blocks infrared light, is suppressed.

2. An optical low pass filter according to claim 1, wherein said third laminated film comprises two layers of optical thin film of high refractivity material and low refractivity material.

3. An optical low pass filter according to claim 1, wherein said third laminated film comprises two or more layers of optical thin film of high refractivity material and low refractivity material.

4. An optical low pass filter according to claim 1, wherein an optical thin film having an optical film thickness of between 0.1 and 0.9 is interposed between a lower surface of said first laminated film and a surface of said optical plate.

5. An optical low pass filter according to claim 1, wherein an optical thin film having an optical film thickness of between 0.1 and 0.9 is provided on an upper surface of said second laminated film.

6. An optical low pass filter including an optical plate having an infrared shield film, the infrared shield film comprising:
   (a) a first laminated film including alternating layers of optical thin films of high refractivity material and low refractivity material, each layer of optical thin film having an optical film thickness "a",
   (b) a second laminated film including alternating layers of optical thin films of high refractivity material and low refractivity material, each layer of optical thin film having an optical film thickness "b", and in which said first laminated film and said second laminated film are laminated in sequence from at least one primary surface of the optical plate; and (c) a third laminated film including a plurality of alternating layers of optical thin films of high refractivity material and low refractivity material, each layer of optical thin film having an optical film thickness "c", the third laminated film being interposed between said first laminated film and said second laminated film, wherein b>c>a, whereby a ripple in an opaque zone, which blocks infrared light, is suppressed.

* * * * *